United States Patent [19]

Turner et al.

[11] Patent Number: 4,801,422
[45] Date of Patent: Jan. 31, 1989

[54] APPARATUS FOR INSTALLING AND REMOVING A CONTROL ROD DRIVE IN A NUCLEAR REACTOR

[75] Inventors: Arthur P. L. Turner, Burke; S. Robert Ward, McLean, both of Va.

[73] Assignee: Electric Power Research Institute, Inc., Palo Alto, Calif.

[21] Appl. No.: 945,842

[22] Filed: Dec. 23, 1986

[51] Int. Cl.[4] ............................................. G21C 19/20
[52] U.S. Cl. .................................................... 376/260
[58] Field of Search ....................................... 376/260

[56] References Cited

U.S. PATENT DOCUMENTS

| | | | |
|---|---|---|---|
| 3,836,430 | 9/1974 | Frisch et al. | 376/260 |
| 4,053,355 | 10/1977 | Vuckovich | 376/260 |
| 4,158,600 | 6/1979 | Akimoto et al. | 376/260 |
| 4,175,000 | 11/1979 | Jabsen | 376/260 |
| 4,288,290 | 9/1981 | Saima et al. | 376/260 |
| 4,292,133 | 9/1981 | Sasaki et al. | 376/260 |
| 4,518,559 | 5/1985 | Fischer et al. | 376/260 |

FOREIGN PATENT DOCUMENTS

| | | | |
|---|---|---|---|
| 0134198 | 11/1978 | Japan | 376/260 |
| 0134288 | 10/1979 | Japan | 376/260 |
| 1002098 | 1/1986 | Japan | 376/260 |

OTHER PUBLICATIONS

Electric Power Research Institute Final Report, EPRI NP-3895, Project 2410-1, Mar. 1985.

Primary Examiner—Charles T. Jordan
Assistant Examiner—Daniel Wasil
Attorney, Agent, or Firm—Flehr, Hohbach, Test, Albritton & Herbert

[57] ABSTRACT

Apparatus for installing and removing a control rod drive from beneath the pressure vessel of a nuclear reactor, including an elevator carriage for carrying the control rod drive in a generally horizontal position and a single winch mounted on a cart for swinging the control rod drive between horizontal and vertical positions and for raising and lowering the drive when it is in a vertical position. A pneumatic cylinder provides the final lifting action for seating and removing the control rod drive. The lower end of the control rod drive is supported on the elevator cradle by a self-centering bearing which permits the horizontal position of the drive to be adjusted for final alignment with the drive housing. The pneumatic cylinder is mounted on a swinging arm which allows the cylinder to remain in axial alignment with the control rod drive as it is moved horizontally. The upper end of the control rod drive is retained on the elevator by a support roller which automatically swings out of the way and re-engages the drive as it is installed and removed. A pair of winch cables are employed for safety, and loading of the cables is equalized by interconnected hydraulic cylinders connected between the cables and the lower end of the elevator.

21 Claims, 8 Drawing Sheets

FIG_1

FIG_2

FIG_3

FIG_4

FIG_6

FIG_5

FIG_9

FIG_10

FIG_7

FIG_8

FIG_11

FIG_12

FIG_13

FIG_14

FIG_15

FIG_16       FIG_17

FIG_18

FIG_19

APPARATUS FOR INSTALLING AND REMOVING A CONTROL ROD DRIVE IN A NUCLEAR REACTOR

This invention pertains generally to nuclear reactors, and more particularly to apparatus for installing and removing a control rod drive in a nuclear reactor.

Control rods are the primary form of reactivity control in boiling water reactors. Compensation for changes in reactivity resulting from uranium depletion and fission product build-up is provided by moving control rods out of the reactor. Emergency shutdown of the reactor is accomplished by rapid insertion of the control rods. The control rods are positioned in the reactor by means of hydraulic drive mechanisms which are commonly known as control rod drives. A control rod drive generally comprises a double-acting hydraulic cylinder which uses demineralized water as a working fluid. The control rods are moved by the hydraulic cylinder and latched in fixed positions at predetermined intervals over the travel of the drive. The latch system is arranged so that the control rods can be inserted without unlatching but can only be withdrawn by a programmed unlatching sequence. This assures that the rods can always be inserted for emergency shutdown, but will retain their positions if the hydraulic pressure fails.

Control rod drives must be removed periodically from the reactor and rebuilt to replace seals and other worn components. The removal and replacement of control rod drives is a difficult operation which must be performed in a relatively cramped space under the reactor vessel in an area of high contamination and radiation. This procedure can be both time consuming and hazardous to the personnel involved.

A boiling water reactor commonly has a gallery or room below the reactor vessel where the control rod drives are installed and removed. The control rod drives are transported into and out of the gallery in a horizontal position on a transfer cart which runs on tracks on a rotatable platform in the gallery. The transfer cart is positioned beneath a desired control rod drive by rotating the platform and moving the transfer cart along the tracks. Heretofore, a pair of winches mounted on a separate cart have been utilized for swinging the control rod drive between horizontal and vertical positions and for raising and lowering the drive when it is in a vertical position. One disadvantage of this technique is that separate winches are required for swinging the control rod drive between horizontal and vertical positions and for raising and lowering the drive. Also, it is necessary to interrupt the lifting operation and reposition the cable on the control rod drive in order to obtain sufficient travel for complete insertion or removal of the drive.

Examples of apparatus of this general character for replacing control rod drives in nuclear reactors are found in U.S. Pat. Nos. 4,158,600, 4,288,290 and 4,292,133 and in Japanese patent application No. 53-41540.

It is in general an object of the invention to provide new and improved apparatus for installing and removing control rod drives in nuclear reactors.

Another object of the invention is to provide apparatus of the above character which overcome the limitations and disadvantages of apparatus heretofore employed for installing and removing control rod drives.

These and other objects are achieved in accordance with the invention by providing an elevator carriage for carrying a control rod drive into and out of the region beneath the pressure vessel of a nuclear reactor in a generally horizontal position and a single winch mounted on a cart for swinging the control rod drive between horizontal and vertical positions and for raising and lowering the drive when it is in a vertical position. A pneumatic cylinder provides the final lifting action for seating and removing the control rod drive, and no repositioning of cabling is required during the operation of the apparatus. The lower end of the control rod drive is supported on the elevator carriage by a self-centering bearing which permits the horizontal position of the drive to be adjusted for final alignment with the drive housing without repositioning the carriage. The pneumatic cylinder is mounted on a swinging arm which allows the cylinder to remain in axial alignment with the control rod drive as it is moved horizontally. The upper end of the control rod drive is retained on the elevator by a support roller which automatically swings out of the way and re-engages the drive as it is installed and removed. A pair of winch cables are employed for safety, and loading of the cables is equalized by interconnected hydraulic cylinders connected between the cables and the lower end of the elevator.

Figure 1:
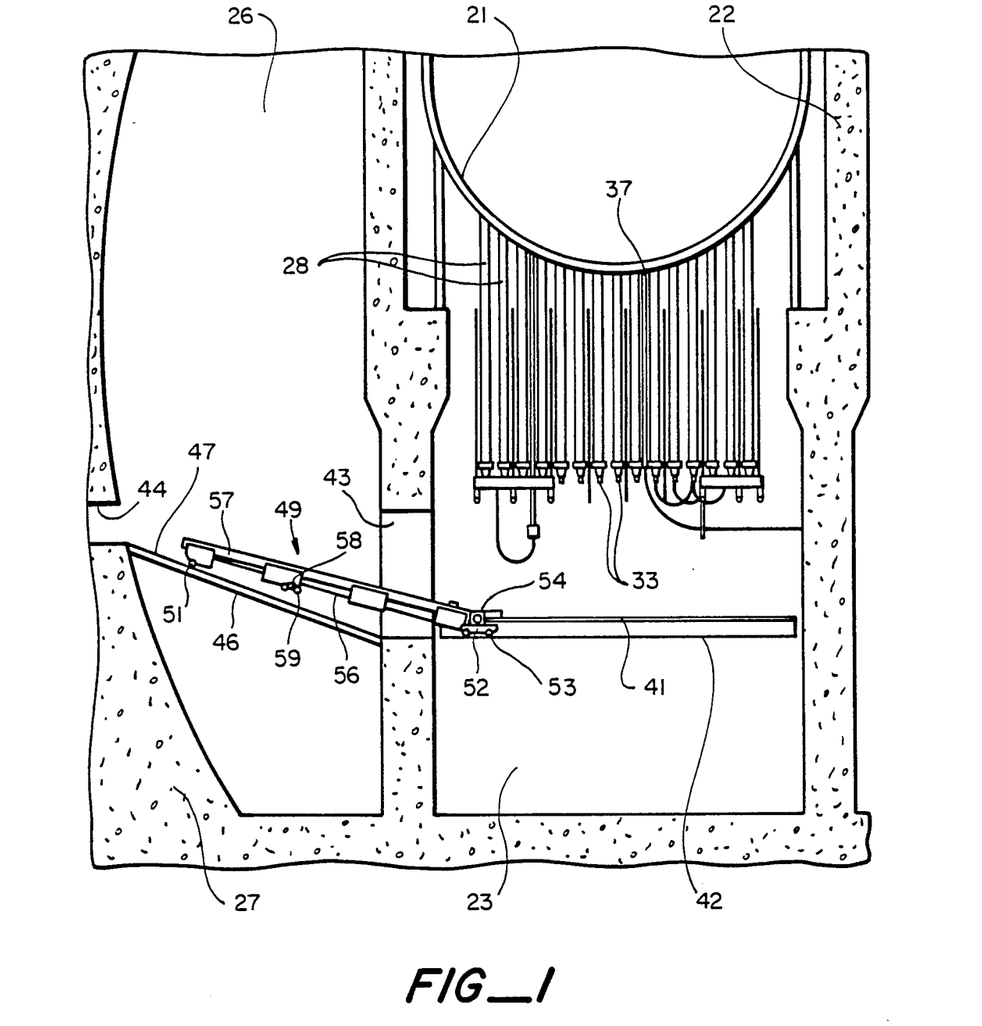
FIG. 1 is a fragmentary vertical sectional view, somewhat schematic, of one embodiment of a reactor with apparatus for installing and removing control rod drives in accordance with the invention.
Figure 2:
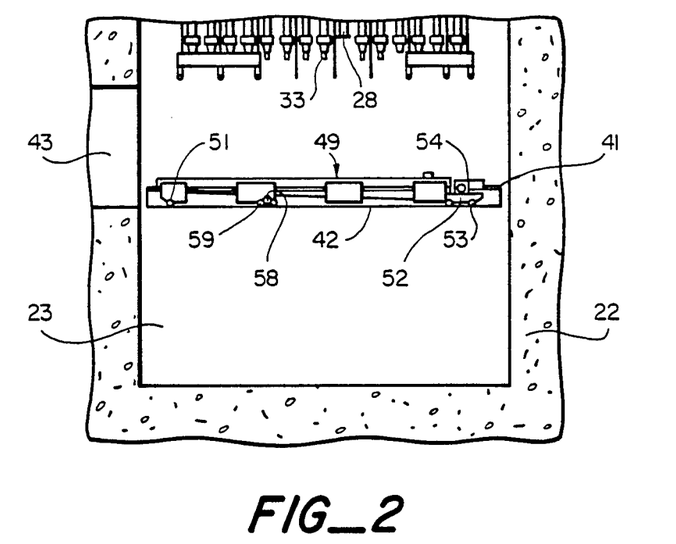
FIGS. 2–4 are views generally similar to FIG. 1 illustrating the tilting and lifting operation of the apparatus.

In the drawings, the invention is illustrated in connection with a boiling water reactor having a pressure vessel 21 supported by a concrete cylinder 22 commonly known as a pedestal. A control rod drive gallery or undervessel room 23 is formed within the pedestal below the reactor vessel. The diameter of the room is approximately equal to the diameter of the vessel, and the height of the room is sufficient to allow the control rod drives to be withdrawn from the bottoms of the control rod drive housings. A drywell 26 is formed within the primary containment vessel 27 outside the pedestal and the reactor vessel. The containment vessel is typically fabricated of concrete.

A plurality of control rod drive housings 28 extend vertically downward from the lower wall of the reactor vessel. Each of these housings comprises a rigid tube 29 with a mounting flange 31 at the lower end thereof.

Figures 5, 9, 10:
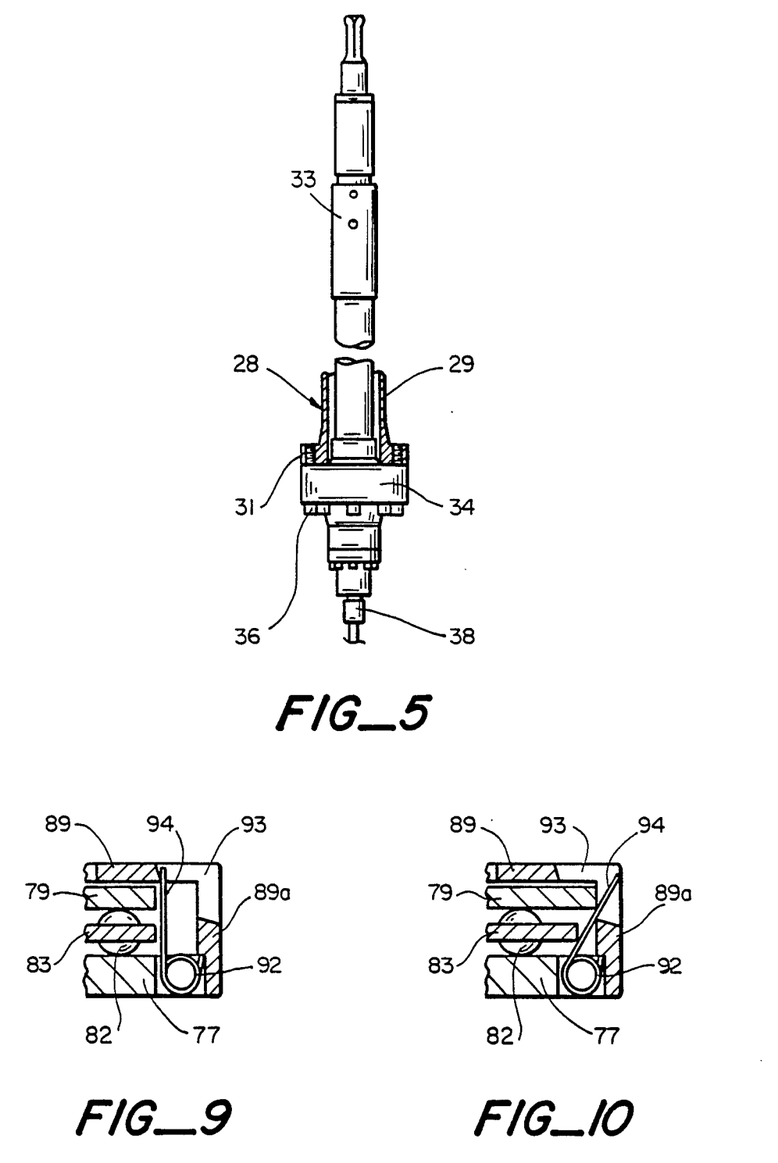
FIG. 5 is a side elevational view, partly broken away, of a control rod drive mounted in a control rod drive housing in the reactor of FIG. 1.
FIG. 9 is a cross-sectional view taken along line 9—9 in FIG. 7 illustrating the bearing assembly in one operating position.
FIG. 10 is a cross-sectional view similar to FIG. 9 illustrating the bearing assembly in a second operating position.

Control rod drives 33 are inserted into and removed from drive housings 28 from the lower ends of the housings. Each of the control rod drives has a mounting flange 34 near its lower end, and the drive is secured to the housing by flange bolts 36 which pass through openings (not shown) in flange 34 and are threadedly received in the housing flange. A control rod drive for use in a boiling water reactor is typically on the order of 15.5 feet long and weighs on the order of 450 pounds.

Conditions in the reactor vessel are monitored through instrumentation tubes 37 which are positioned between the control rod drive housings. Instruments in the undervessel room typically include source range monitors, intermediate range monitors, average power range monitors, local power range monitors, traveling in-core probes and position indicating probes for monitoring the positions of the control rods. The position indicating probes are positioned within the control rod drives, and connections to these probes are made through connectors 38 at the lower ends of the control rod drives.

An equipment platform 41 is mounted in gallery 23 for rotation about a central vertical axis. The platform includes a set of tracks 42 which extend diametrically across it. An access opening 43 is formed in the pedestal wall on one side of the platform, and a control rod drive removal hatch 44 is formed in the side wall of containment vessel 27. An inclined ramp 46 extends between the access opening and the hatch, and a set of tracks 47 extends down the ramp and through the access opening.

Control rod drives are carried into and out of the undervessel room in a generally horizontal position by an elevator carriage 49 which passes through hatch 44 and rides on tracks 47, 42. The elevator carriage has wheels 51 at one end thereof, and a winch cart 52 with wheels 53 is connected to the other end of the elevator carriage. The winch cart has a single winch 54 mounted thereon with a pair of winch cables 56 which pass around pulleys (not shown) on opposite sides of the elevator carriage at the end of the carriage to which the winch cart is connected. The winch cart travels into and out of the reactor with the elevator carriage through hatch.

Figure 3:
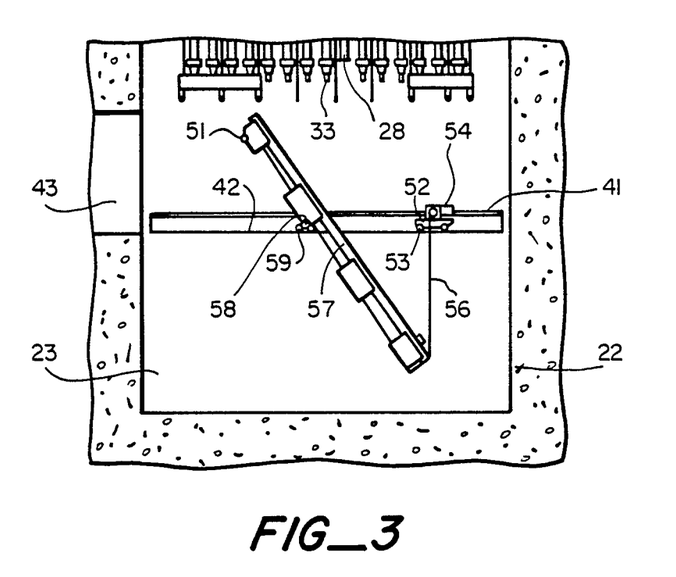
Figure 4:
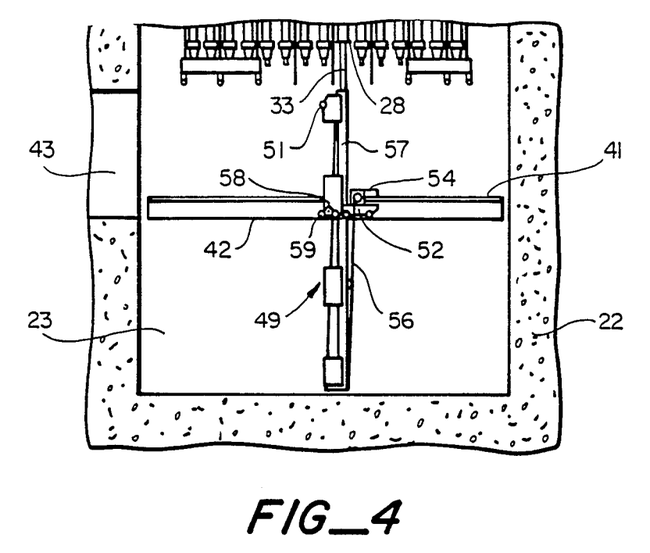

The elevator carriage has an elongated frame 57 which is pivotally mounted on a central dolly 58 with wheels 59 which engage track 42 when the carriage is on the equipment platform. When the winch cart is detached from the elevator carriage, the elongated frame can pivot about the dolly between horizontal and vertical positions. The dolly has a shaft 61 about which the frame pivots. This pivot axis is located above the center of gravity of the control rod drive when the elevator carriage is in an upright position so that the carriage tends to swing by gravity to the vertical position. Thus, to move the elevator carriage from a horizontal position to a vertical position, the winch cart is unlatched from the carriage, and the winch cables are let out to lower the lower end of the elevator carriage, as illustrated in FIGS. 3 and 4. As the elevator carriage swings from a horizontal position to a vertical position, the winch cart 52 and the elevator carriage dolly 58 roll along track 42 toward each other.

The elevator carriage also has a cradle 62 in which the control rod drive 33 is received. The winch cables are connected to the lower end of the cradle, and the cradle is adapted for movement axially of the elongated frame for raising and lowering the control rod drive when the carriage is in a vertical position. To raise the drive, the carriage is swung to the vertical position, and the winch cart is positioned adjacent to the vertical carriage and latched to the frame. The elevator cradle is unlatched from the frame, and the winch cables are drawn in to lift the cradle and the drive carried thereby. The control rod drive is lowered by letting out the winch cables with the winch cart latched to the vertically extending carriage. Once the control rod drive has been lowered, the elevator cradle is latched to the frame, the winch cart is separated from the upright carriage, and the winch cables are drawn in to swing the elevator carriage and the control rod drive to a horizontal position.

Figure 6:
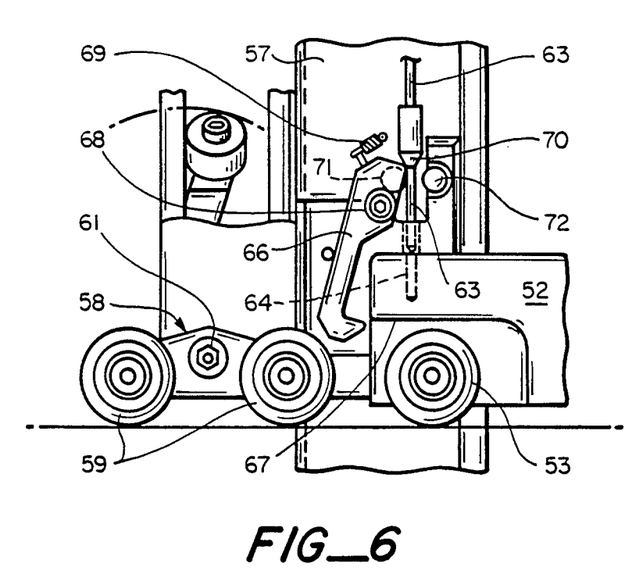
FIG. 6 is a side elevational view of the portion of the apparatus of FIG. 1 illustrating the latch mechanism for securing the winch cart to the elevator carriage.

The latch mechanism which secures the winch cart 52 to the upright frame 57 is illustrated in FIG. 6. This means includes a latch pin 63 slidably mounted on the elevator frame for engagement with a socket 64 in the winch cart and a latch hook 66 pivotally mounted on the frame for engagement with a horizontal shoulder 67 on the cart. The latch pin extends vertically and prevents horizontal separation of the winch cart and the elevator carriage, and the latch hook prevents vertical separation.

Latch hook 66 is mounted on a pivot pin 68 and urged out of engagement with the winch cart by a return spring 69. The latch hook is moved to its engaged position by a cam surface 70 on the latch pin which engages a cam follower 71 on the latch hook as the latch pin is advanced toward its socket. The cam surface 70 on latch pin 63 is supported by a fixed cam follower 72 mounted on frame 57 opposite cam follower 71. When the latch pin is retracted, the latch hook is returned to its retracted or disengaged position by return spring 69.

Figure 7:
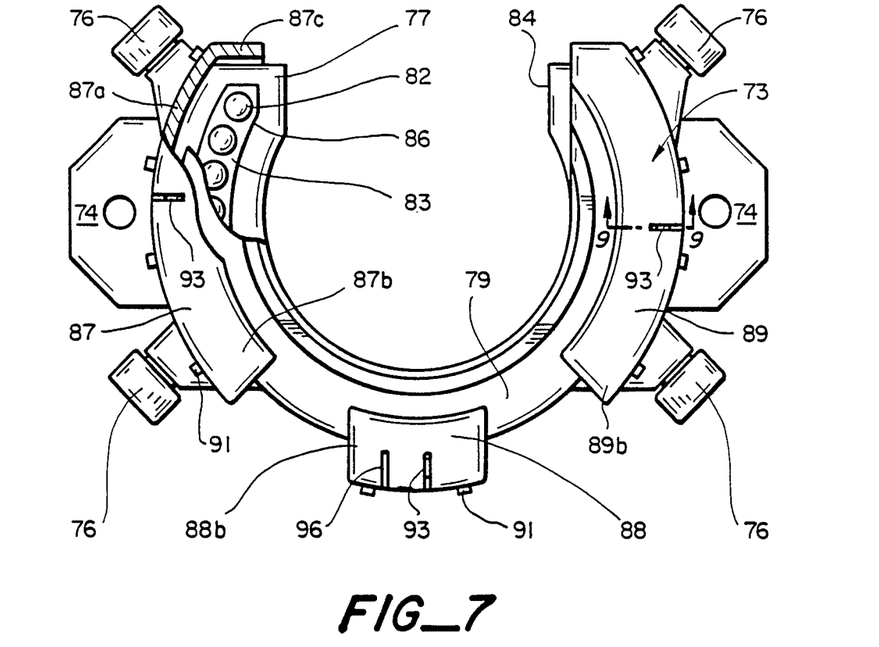
FIG. 7 is a top plan view of a bearing assembly for use in the apparatus of FIG. 1.
Figure 8:
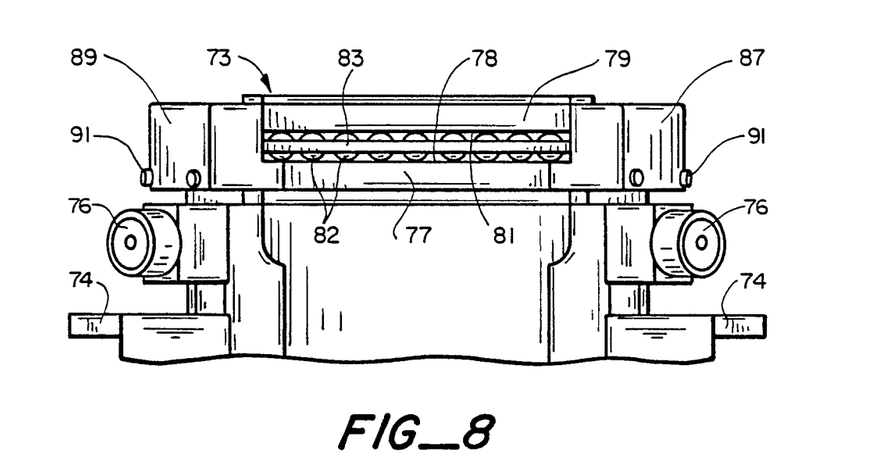
FIG. 8 is a front elevational view of the bearing assembly of FIG. 7.

The lower end of control rod drive 33 is supported on cradle 62 by a bearing assembly 73 which permits both rotational and horizontal movement of the control rod drive for proper alignment with housing 28. The bearing assembly is bolted to elevator cradle 62, and and winch cables 56 are attached to the cradle through brackets 74. The cradle is stabilized by a plurality of guide rollers 76 which engage the elevator frame 57.

Bearing assembly 73 includes a stationary lower race 77 having a generally planar upper bearing surface 78 and an upper bearing race 79 having a generally planar lower bearing surface 81. A plurality of balls 82 are positioned between the upper and lower races in rolling engagement with the bearing surfaces and retained by a cage 83. Races 77, 79 each comprise a semiannular plate having an opening 84 on one side thereof through which the control rod drive can pass. Cage 83 is likewise an annular structure with an opening 86 through which the drive can pass.

Retainer brackets 87–89 are secured to lower race 77 by mounting screws 91. Each of these brackets has a cylindrically curved side wall 87a–89a which limits the lateral movement of upper race 79, and a top flange 87–89 which holds the races together. Brackets 87–89 also have end walls 87c–89c which limit the movement of the upper race toward the side of the assembly on which opening 84 is located.

Torsion springs 92 mounted in radial slots 93 in retainer brackets 87–89 urge upper race 79 and ball cage 83 toward a central position relative to lower race 77. Each of these springs has an arm 94 which engages the peripheries of the upper race and the cage to urge the race and the cage in an inward direction. A second torsional spring 96 is mounted in retainer bracket 88 to urge the upper race and the cage toward opening 84.

In one presently preferred embodiment, bearing assembly 73 permits the control rod drive to be moved up to about one-half inch in any horizontal direction. The bearing returns automatically to its central position following the installation of a control rod drive so that it is in the center of its travel for proper alignment with the next drive to be removed.

Figure 11:
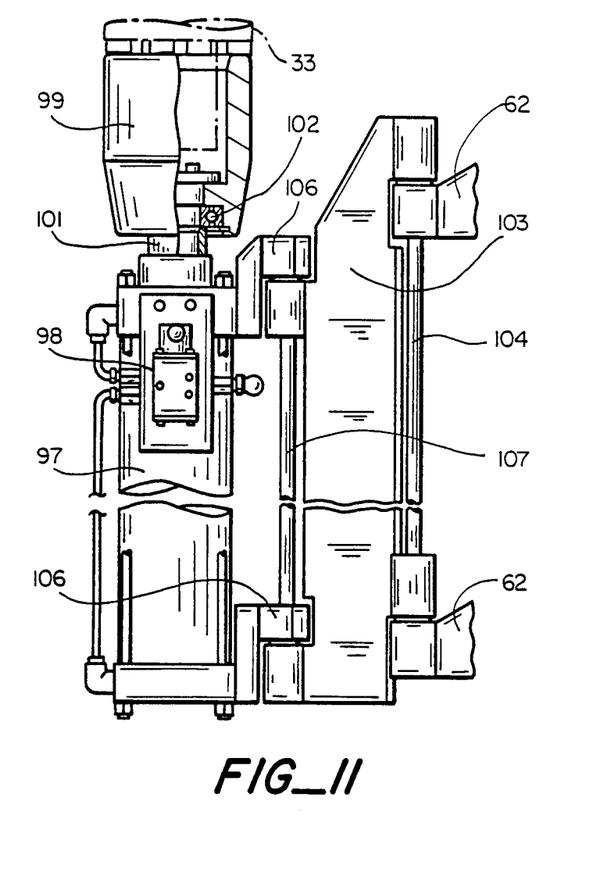
FIG. 11 is a fragmentary side elevational view, partly broken away, of a portion of the apparatus of FIG. 1 illustrating a pneumatically actuated cylinder for raising and lowering the control rod drive.

A pneumatically actuated cylinder 97 is mounted on the elevator carriage for the final lifting and the initial lowering of the control rod drive into the drive housing. This cylinder is a double-acting cylinder with a control valve 98 and a travel of approximately 2–3 feet. This cylinder eliminates the need for repositioning the winch cables on the elevator or to employ an extension piece to obtain sufficient travel, and it avoids overloading of the cables which might occur if they were utilized to seat the drive in the housing.

A cup 99 is mounted on the piston 101 of cylinder 97 for engagement with the lower end of control rod drive 33. A ball bearing 102 between the piston and cup permits rotation of the control rod drive for proper alignment of the bolt holes in the mounting flanges.

Figure 12:
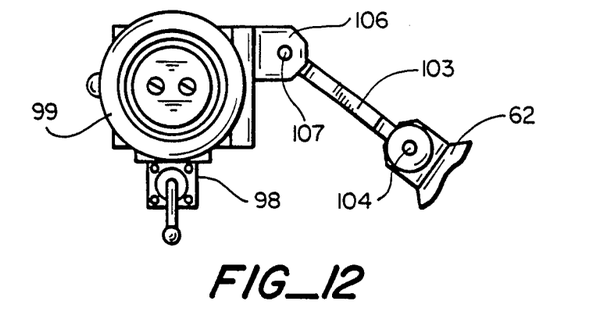
FIG. 12 is a top plan view of the portion of the apparatus illustrated in FIG. 11.

Cylinder 97 is mounted on the elevator cradle by means of a double hinged support which permits the cylinder to be shifted horizontally and maintained in coaxial alignment with the control rod drive. This support includes a swing arm 103 which is pivotally mounted on elevator cradle 62 by means of a vertically extending hinge pin 104. The cylinder is pivotally mounted on the swing arm by radially extending mounting flanges 106 and a second vertical hinge pin 107. By pivoting arm 103 and flanges 106 about hinge pins 104, 107, respectively, cylinder 97 can be moved to a desired horizontal position.

Figure 13:
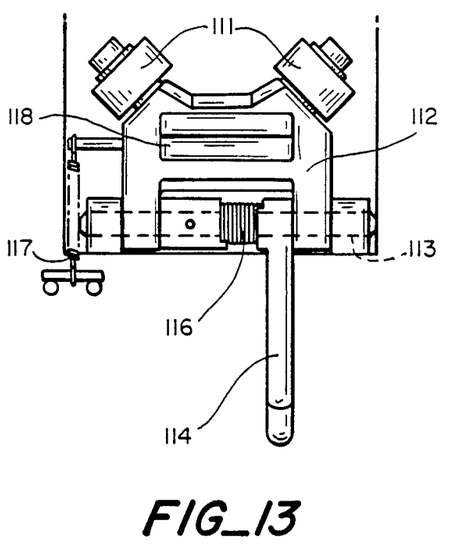
FIG. 13 is a front elevational view of a roller assembly for holding the control rod drive on the elevator carriage as it is raised and lowered, showing the roller in a partially disengaged position.

Means is provided for retaining the upper portion of the control rod drive to the elevator carriage while the carriage is being moved between horizontal and vertical positions and while it is in the vertical position. This means includes a pair of support rollers 111 mounted on an arm 112 for rolling engagement with the exterior of the control rod drive. Arm 112 is pivotally mounted on the frame 57 of the elevator carriage by means of a shaft 113 which extends in a direction perpendicular to the axis of the drive. An actuator finger 114 is also pivotally mounted on shaft 113, and a torsion spring 116 yieldably maintains a predetermined angular relationship between arm 112 and finger 114. In the rest position, the angle subtended by the arm and the finger is slightly less than 90°. A spring 117 connected to arm 112 also urges rollers 111 into engagement with the control rod drive.

Figure 14:
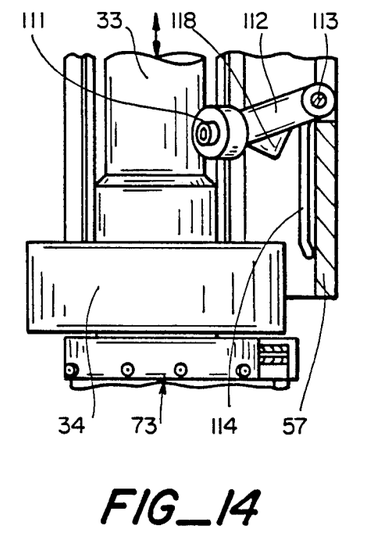
FIGS. 14–17 are side elevational views illustrating the operation of the roller assembly of FIG. 13, with FIG. 16 showing the roller in the same position as FIG. 13.
Figure 15:
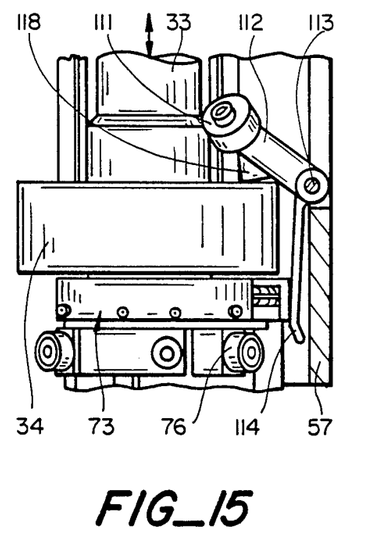
Figure 16:
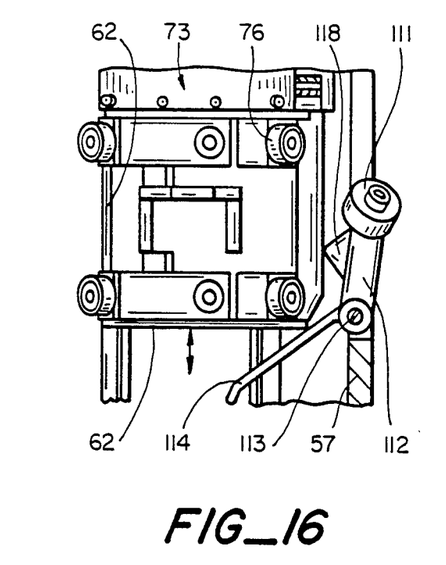

Before the control rod drive is lifted, arm 112 and finger 114 are in the positions illustrated in FIG. 14, with rollers 111 engaging the body of the drive to retain the drive on the elevator carriage. The arm and finger remain in these positions as the control rod drive is lifted until mounting flange 34 approaches rollers 111. As the mounting flange approaches the rollers, a cam 118 on the lower side of arm 112 is engaged by the upper surface of the flange, causing the arm and finger to rotate in a clockwise direction to the position illustrated in FIG. 15. In this position, finger 114 engages bearing assembly 73, and torsion spring 116 continues to urge roller 111 into engagement with the drive. As the lifting continues, the torsion spring yields, and rollers 111 are deflected out of the path of the mounting flange to an over-center position relative to shaft 113, as illustrated in FIG. 16. As the bearing assembly rises past the rollers, cam 118 engages the side wall cradle 62, and torsion spring 116 pivots finger 114 in a clockwise direction beneath the bearing assembly. At the top of the lift, the bearing assembly is moved past finger 114, and the roller assembly rests in the position illustrated in FIG. 17, with the weight of rollers 111 and arm 112 tending to hold the assembly in this position.

Figure 17:
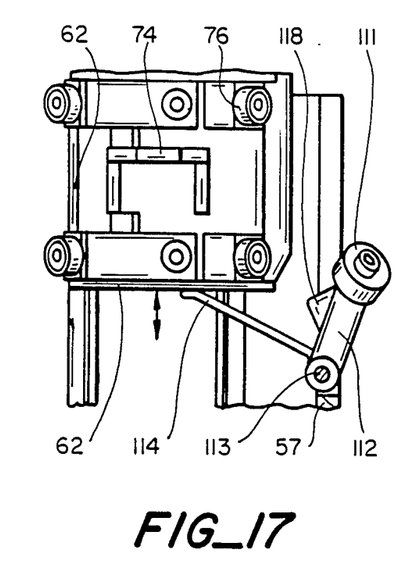

As the carriage descends, cradle 62 pivots actuator finger 114 in a counterclockwise direction, and torsion spring 116 draws cam 118 back into engagement with the side of the cradle. When the bearing assembly and flange 34 have moved below cam 118, rollers 111 swing into engagement with the main body of the control rod drive.

Figure 18:
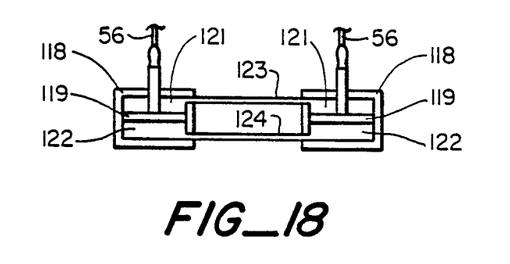
FIG. 18 is a centerline sectional view of a hydraulic system for equalizing loading of the winch cables by the elevator carriage.

Means is provided for equalizing the loading of winch cables 56 by elevator cradle 62. This means includes a pair of hydraulic cylinders 118 which are connected between the cables and the elevator cable. Each of these cylinders has a movable piston 119 to which one of the cables is attached, with chambers 121, 122 of variable volume being formed above and below the piston. Each of these chambers is filled with hydraulic fluid, and the corresponding chambers in the two cylinders are connected in fluid communication with each other by lines 123, 124. The cylinder bodies are connected to the elevator cradle, and the fluid in chambers 121 is pressurized by the load applied to the cables by the cradle.

Since the chambers 121 in the two cylinders are in fluid communication with each other, the pressures in these two chambers remain equal, and the two cables carry equal loads.

Figure 19:
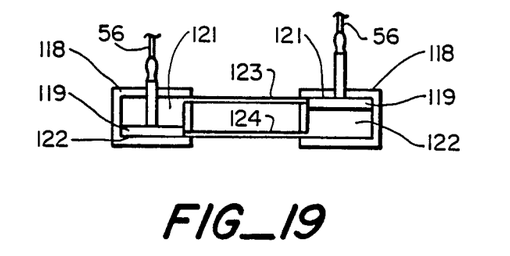
FIG. 19 is a view similar to FIG. 18 illustrating the hydraulic system in a different operating position.

If one of the winch cables should break, as illustrated in FIG. 19, the pressure in chamber 121 of the cylinder with the piston connected to the broken cable will drop to zero, and the fluid from the other cylinder will be transferred to this chamber as the piston connected to the unbroken cable travels to the upper end of its cylinder. Thereafter, this cable carries the entire load of the elevator.

It is apparent from the foregoing that a new and improved apparatus for installing and removing control rod drives in a nuclear reactor has been provided. While only certain presently preferred embodiments have been described in detail, as will be apparent to those familiar with the art, certain changes and modifications can be made without departing from the scope of the invention as defined by the following claims.

We claim:

1. In apparatus for installing and removing a control rod drive from beneath the pressure vessel of a nuclear reactor: an elevator carriage for carrying the control rod drive into and out of the region beneath the pressure vessel in a generally horizontal position, an elevator cradle mounted on the carriage for pivotal movement about an axis between horizontal and vertical positions and for vertical movement when in the vertical position, means for securing the control rod drive to the elevator cradle, a winch cart movable horizontally between a first position spaced from the pivot axis and a second position near the pivot axis and having a winch cable supporting the lower end of the elevator carriage for moving the elevator carriage and the control rod drive between horizontal and vertical positions when the cart is spaced from the pivot axis and for raising and lowering the elevator cradle and the control rod drive relative to the elevator carriage when the cart is positioned near the pivot axis, and a bearing mounting the control rod drive on the elevator cradle and permitting rotational and horizontal movement of the control rod drive when the drive is in a vertical position, said bearing comprising a first race having a generally planar bearing surface perpendicular to the axis of the control rod drive, a second race having a generally planar bearing surface spaced from the generally planar bearing surface of the first race, and a plurality of balls in rolling engagement with the generally planar bearing surfaces of the first and second races permitting rotational and lateral movement of the second race relative to the first race.

2. The apparatus of claim 1 including means yieldably urging the second race toward a central position relative to the first race.

3. The apparatus of claim 1 wherein the first and second races each comprise a semiannular plate which is open on one side to pass the control rod drive in a direction perpendicular to the axis of the drive.

4. The apparatus of claim 3 including means for mounting the first race in a fixed position on the elevator cradle, means connected to the first race for limiting the horizontal movement of the second race, and means for yieldably urging the second race into coaxial alignment with the first race.

5. The apparatus of claim 4 wherein the means for limiting the horizontal movement of the second race comprises a plurality of retainers spaced peripherally about the first race, each of said retainers having a side wall which serves as a limiting abutment for the peripheral edge portion of the second race and a flange generally parallel to the bearing surfaces for preventing axial separation of the first and second races, and the means yieldably urging the second race into coaxial alignment comprises a plurality of springs in peripheral engagement with the second race.

6. The apparatus of claim 5 wherein the springs comprise torsion springs mounted on the retainers.

7. The apparatus of claim 1 including a pneumatically actuated cylinder mounted on the elevator cradle for raising and lowering the control rod drive relative to the elevator cradle.

8. The apparatus of claim 7 including a bearing positioned between the pneumatic cylinder and the control rod drive to permit rotation of the control rod drive about its axis.

9. The apparatus of claim 7 including means for mounting the pneumatic cylinder on the elevator cradle in such manner that the cylinder can move horizontally with the control rod drive when the drive is in a vertical position.

10. In apparatus for installing and removing a control rod drive from beneath the pressure vessel of a nuclear reactor: an elevator carriage for carrying the control rod drive into and out of the region beneath the pressure vessel in a generally horizontal position, an elevator cradle mounted on the carriage for pivotal movement about an axis between horizontal and vertical positions and for vertical movement when in the vertical position, a support roller pivotally mounted on the upper portion of the elevator carriage and engageable with the control rod drive for retaining the control rod drive on the elevator cradle as the control rod drive is raised and lowered, means yieldably urging the support roller toward the control rod drive and permitting the roller to be deflected away from the control rod ddrive to permit a flange of increased diameter at the lower end of the control rod drive to move past the roller as the control rod drive is raised and lowered, and a winch cart movable lhorizontally between a first position spaced from the pivot axis and a second position near the pivot axis and having a winch cable supporting the lower end of the elevator carriage for moving the elevator carriage and the control rod drive between horizontal and vertical positions when the cart is spaced from the pivot axis and for raising and lowering the elevator cradle and the control rod drive on the elevator carriage when the cart is positioned near the pivot axis.

11. The apparatus of claim 10 wherein the support roller is mounted on an arm which is pivotally mounted on a shaft perpendicular to the axis of the control rod drive, and the means yieldably urging the support roller toward the control rod drive includes an actuator finger pivotally mounted on the shaft and engageable with the elevator cradle and the control rod drive, and a torsion spring connected to the roller arm and the actuator finger for yieldably maintaining a predetermined angular relationship between the arm and the finger.

12. The apparatus of claim 11 wherein the support roller and arm are free to pivot out of engagement with the control rod drive after the flange at the lower end of the control rod drive has been raised above the actuator finger, the actuator finger extending beneath the control rod drive for drawing the support roller back into engagement with a control rod drive upon lowering of the elevator cradle.

13. In apparatus for installing and removing a control rod drive from beneath the pressure vessel of a nuclear reactor: an elevator carriage for carrying the control rod drive into and out of the region beneath the pressure vessel in a generally horizontal position, an elevator cradle mounted on the carriage for pivotal movement about an axis between horizontal and vertical positions and for vertical movement when in the vertical position, means for securing the control rod drive to the elevator cradle, a winch cart movable horizontally between a first position spaced from the pivot axis and a second position near the pivot axis and having a winch cable supporting the lower end of the elevator carriage for moving the elevator carriage and the control rod drive between horizontal and vertical positions when the cart is spaced from the pivot axis and for raising and lowering the elevator cradle and the control rod drive on the elevator carriage when the cart is positioned near the pivot axis, and means for releasably securing the winch cart to the elevator carriage in the first and second positions.

14. The apparatus of claim 13 wherein the means for releasably securing the winch cart to the elevator carriage comprises an axially movable latch pin and a pivotally movable latch hook.

15. The apparatus of claim 14 including means responsive to axial advancement and retraction of the latch pin for moving the latch hook between engaged and released positions.

16. The apparatus of claim 15 wherein the means for moving the latch hook comprises a cam surface which moves with the latch pin and a cam follower connected to the latch hook.

17. In apparatus for installing and removing a control rod drive from beneath the pressure vessel of a nuclear reactor: an elevator carriage for carrying the control rod drive into and out of the region beneath the pressure vessel in a generally horizontal position, an elevator cradle mounted on the carriage for pivotal movement about an axis between horizontal and vertical positions and for vertical movement when in the vertical position, means for securing the control rod drive to the elevator cradle, a winch cart movable horizontally between a first position spaced from the pivot axis and a second position near the pivot axis and having a winch cable supporting the lower end of the elevator carriage for moving the elevator carriage and the control rod drive between horizontal and vertical positions on the elevator carriage when the cart is spaced from the pivot axis and for raising and lowering the elevator cradle and the control rod drive when the cart is positioned near the pivot axis, a bearing mounting the control rod drive on the elevator cradle and permitting rotational and horizontal movement of the control rod drive when the drive is in a vertical position, a swing arm pivotally mounted on the elevator cradle for movement about a vertically extending axis when the cradle is in a vertical position, a pneumatically actuated cylinder in axial alignment with the control rod drive for raising and lowering the control rod drive, and means pivotally mounting the cylinder on the swing arm for movement about an axis spaced from and generally parallel to the vertically extending axis so that the position of the cylinder and the control rod drive can be shifted horizontally about the vertically extending axes.

18. The apparatus of claim 17 including a bearing positioned between the upper end of the pneumatic cylinder and the lower end of the control rod drive permitting rotation of the control rod drive about its axis relative to the pneumatic cylinder.

19. In apparatus for installing and removing a control rod drive from beneath the pressure vessel of a nuclear reactor: an elevator carriage for carrying the control rod drive into and out of the region beneath the pressure vessel in a generally horizontal position, an elevator cradle mounted on the carriage for pivotal movement about an axis between horizontal and vertical positions and for vertical movement when in the vertical position, means for securing the control rod drive to the elevator cradle, a winch cart movable horizontally between a first position spaced from the pivot axis and a second position near the pivot axis and having a pair of winch cables supporting the lower end of the elevator carriage for moving the elevator carriage and the control rod drive between horizontal and vertical positions when the cart is spaced from the pivot axis and for raising and lowering the elevator cradle and the control rod drive on the elevator carriage when the cart is positioned near the pivot axis, and means for equalizing the loading of the two winch cables by the elevator cradle and the control rod drive.

20. The apparatus of claim 19 wherein the means for equalizing the loading of the winch cables comprises a pair of hydraulic cylinders each having a chamber of variable volume with a body of fluid therein, means connecting the elevator cradle and respective ones of the cables to the cylinders in such manner that the fluid in the chambers is pressurized by the loads applied to the cables, and means connecting the chambers in the two cylinders in fluid communication with each other to equalize the pressure of the fluid in the two chambers.

21. The apparatus of claim 20 wherein each of the hydraulic cylinders has a movable piston to which one of the cables is connected.

* * * * *